No. 683,365. Patented Sept. 24, 1901.
W. J. WITTMANN.
VEHICLE TIRE.
(Application filed June 21, 1901.)
(No Model.)
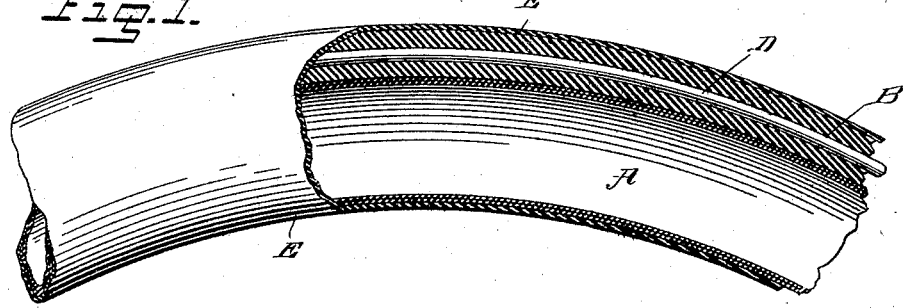
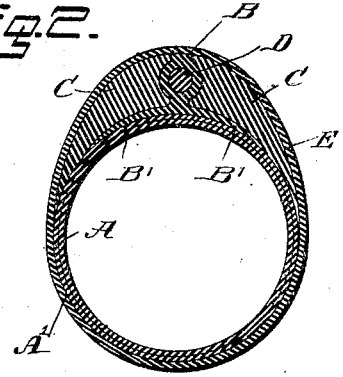
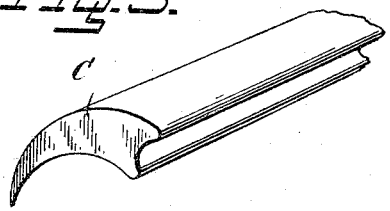
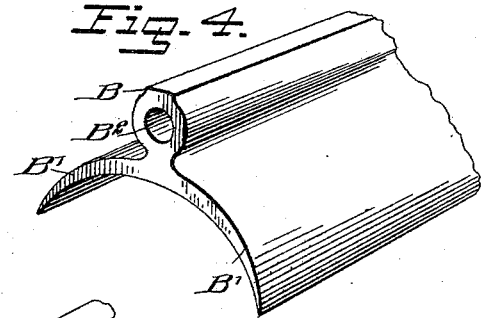
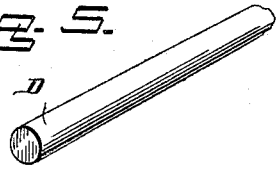
WITNESSES:
James F. Duhamel
Geo. G. Hosted
INVENTOR
William J. Wittmann
BY
Munn
ATTORNEYS

UNITED STATES PATENT OFFICE.

WILLIAM JOHN WITTMANN, OF ROCHESTER, NEW YORK.

VEHICLE-TIRE.

SPECIFICATION forming part of Letters Patent No. 683,365, dated September 24, 1901.

Application filed June 21, 1901. Serial No. 65,434. (No model.)

*To all whom it may concern:*

Be it known that I, WILLIAM JOHN WITTMANN, a citizen of the United States, and a resident of Rochester, in the county of Monroe and State of New York, have invented a new and Improved Vehicle-Tire, of which the following is a full, clear, and exact description.

The invention relates to pneumatic tires; and its object is to provide a new and improved single-tube pneumatic tire which is simple and durable in construction, rendered puncture-proof, and sufficiently elastic to insure convenient and easy riding without undue jolting or jarring.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a sectional side elevation of the improvement. Fig. 2 is an enlarged transverse section of the same. Fig. 3 is a perspective view of one of the side pieces. Fig. 4 is a perspective view of the stay, and Fig. 5 is a similar view of the core for the stay.

The tire consists, essentially, of an inflatable tube A, a stay B, and side pieces C, located on opposite sides of the stay B, as is plainly indicated in the drawings. The tube A is made of vulcanized rubber, having a covering A' of two or more layers of canvas or other like fabric material and put on its outer surface in such a manner as to render the tube flexible. The stay B is formed at its inner end with side flanges B', adapted to engage the peripheral surface of the tube A, at the outer portion thereof, said stay B extending outwardly in a radial direction and having an annular opening in its side for receiving a core D, of rubber or like elastic material. The stay B is preferably of vulcanized rubber, while the core D is of pure unvulcanized rubber, and the side pieces are preferably of pure rubber and are dipped in bromin for an instant or treated otherwise to slightly coat or vulcanize the same. The side pieces fit snugly upon the sides of the stay and its flanges B' and also reach past the sides of the flanges upon the peripheral surface of the tube A, the latter, as well as the side pieces and the top of the stay, being inclosed in a covering or coating E of vulcanized sheet rubber, the same as on ordinary inflatable tires. By the arrangement described the stay B, as well as the pieces C, completely protect the outer portion of the tube A from being punctured, and at the same time said parts give sufficient flexibility to the tire, and thereby render riding easy and convenient without undue jolting or jarring.

The pieces C and the core D are preferably formed of rubber dissolved in naphtha to the consistency of molasses, the mass being spread on a slab to the thickness of about an eighth of an inch to allow the naphtha to evaporate, and then the mass is carefully rolled to free it from air, after which the mass is pressed or rolled into the desired shape to form the side pieces and the core D.

By reference to Fig. 2 it will be seen that the cross-section of the tire is egg-shaped, the single tube A being reinforced at the outer portion by the flanges B', the stay B, and the side pieces C, as above explained.

Having thus fully described my invention, I claim as new and desire to secure by Letters Patent—

1. A tire, comprising a tube, an annular stay extending outwardly in a radial direction from the surface of the tube, and side pieces fitting opposite sides of the stay and the adjacent parallel portion of the tube, as set forth.

2. A tire, comprising a tube, an annular stay extending outwardly in a radial direction from the surface of the tube, side pieces fitting opposite sides of the stay and the adjacent parallel portion of the tube, and a covering or coating for the said tube, the side pieces and the stay, as set forth.

3. A tire, comprising a tube, an annular stay extending outwardly in a radial direction from the surface of the tube, said stay having side flanges for engaging the peripheral surface of the tube, and side pieces fitting opposite sides of the stay and its flanges as well as the adjacent peripheral portion of the tube, as set forth.

4. A tire, comprising a tube, an annular stay extending outwardly in a radial direction from the surface of the tube, said stay having side flanges for engaging the peripheral surface of the tube, side pieces fitting opposite sides of the stay and its flanges as well as the adjacent peripheral portion of the tube, and a core extending in an annular bore formed in the wall of said stay, as set forth.

5. A tire, comprising a tube, an annular stay extending outwardly in a radial direction from the surface of the tube, said stay having side flanges for engaging the peripheral surface of the tube, side pieces fitting opposite sides of the stay and its flanges as well as the adjacent peripheral portion of the tube, and a covering or coating for said tube, the side pieces and the stay, as set forth.

In testimony whereof I have signed my name to this specification in the presence of two subscribing witnesses.

WILLIAM JOHN WITTMANN.

Witnesses:
JOHN F. POWERS,
FRANK J. WOLF.